(12) United States Patent
Chen et al.

(10) Patent No.: US 10,379,421 B2
(45) Date of Patent: Aug. 13, 2019

(54) HIGH ORDER HARMONIC GENERATION OPTIMIZATION SYSTEM AND METHOD IN TIGHT FOCUSING GEOMETRY

(71) Applicant: NATIONAL TSING HUA UNIVERSITY, Hsinchu (TW)

(72) Inventors: Ming-Chang Chen, Hsinchu (TW); Hung-Wei Sun, Taoyuan (TW); Pei-Chi Huang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/190,838

(22) Filed: Nov. 14, 2018

(65) Prior Publication Data

US 2019/0155125 A1    May 23, 2019

(30) Foreign Application Priority Data

Nov. 20, 2017   (TW) .............................. 106140050 A

(51) Int. Cl.
*G02F 1/35* (2006.01)
(52) U.S. Cl.
CPC .......... *G02F 1/3544* (2013.01); *G02F 1/3501* (2013.01); *G02F 1/353* (2013.01); *G02F 2001/3503* (2013.01); *G02F 2001/354* (2013.01); *G02F 2201/58* (2013.01)

(58) Field of Classification Search
CPC ...... G02F 1/3544; G02F 1/3501; G02F 1/353; G02F 2001/3503; G02F 2001/354; G02F 2201/58
See application file for complete search history.

(56) References Cited

U.S. PATENT DOCUMENTS

| | | | | |
|---|---|---|---|---|
| 6,525,868 | B2 * | 2/2003 | Merriam | G02F 1/3534 359/326 |
| 7,283,576 | B2 * | 10/2007 | Krupke | H01S 3/0943 372/55 |
| 7,830,928 | B2 * | 11/2010 | Zhang | H01S 4/00 372/22 |

* cited by examiner

*Primary Examiner* — Rhonda S Peace
(74) *Attorney, Agent, or Firm* — Muncy, Geissler, Olds & Lowe, P.C.

(57) ABSTRACT

A method and system for utilizing the laser defocusing effect for phase matching of high order harmonic generation in a tight focusing geometry are provided. The most suitable focusing geometry, especially those five parameters including: (1) the aperture size of the adjustable iris, (2) the focus position with respect to the gas cell, (3) the backing pressure of the gas cell, (4) the focal length and (5) the length of the gas cell, for achieving phase matching of the target harmonic order and maximal yield of the target harmonic order are disclosed.

10 Claims, 5 Drawing Sheets

HIGH ORDER HARMONIC GENERATION OPTIMIZATION SYSTEM AND METHOD IN TIGHT FOCUSING GEOMETRY

CROSS-REFERENCE TO RELATED APPLICATION

This application claims priority from Taiwan Application No. 106140050, filed on Nov. 20, 2017, in the Taiwan Intellectual Property Office, the content of which is hereby incorporated by reference in their entirety for all purposes.

BACKGROUND OF THE INVENTION

1. Field of the Invention

The present disclosure relates to the optimization system and method of high order harmonic generation (HHG). More precisely, the present disclosure relates to the optimization system and method of high order harmonic generation by utilizing the laser defocusing effect, which can be controlled by the aperture iris, the focus position of the laser with respect to the gas cell and the pressure of the gas cell.

2. Description of the Related Art

The techniques of ultrafast coherent extreme ultraviolet (EUV) sources have been followed with great interest in recent years. Of special considering is the desktop extreme ultraviolet (EUV) or the desktop soft X-Ray which may be generated through the extremely nonlinear process of high order harmonic generation. By focusing an ultrafast laser with high intensity toward a gas cell, the bonding electrons will be ionized to free states. Free electrons are then accelerated by the driving laser field and obtain kinetic energy. When the direction of the laser electric field is reversed, a certain portion of the free electrons is pulled back and recombines with its mother ions. The foregoing process generates high order harmonics of the driving laser.

The foregoing nonlinear process provides coherent EUV and soft X-Ray light with the pulse duration of femtosecond ($10^{-15}$ sec) or attosecond ($10^{-18}$ sec) as an unique light source for spatial analysis of nanometer images and temporal analysis of ultrafast chemical, material and biological dynamics.

However, the efficiency of the high order harmonic generation drops rapidly at higher photon energies. Consequently, most applications so far employ only relatively low-energy EUV.

The foregoing decrease is not due to a lack of the laser intensity, but rather is due to the challenge of overcoming the large phase mismatch between the harmonics and the driving laser. Since the laser generating high order harmonics also ionizes the medium, where excessive free electrons cause defocusing and phase mismatch and hence limit efficiency of the nonlinear optical process.

SUMMARY OF THE INVENTION

In order to solve the foregoing problems, an exemplary embodiment of the present disclosure provides an optimization method for utilizing the laser defocusing effect for phase matching of high order harmonic generation in a tight focusing geometry, that is, look for the most suitable focusing geometry and iris size to achieve phase matching of one target harmonic order and the maximize yield of the target harmonic order. The method includes: (1) implementing the initialization of high order harmonic generation via a focusing geometry: the focusing geometry comprising a laser source, and an adjustable iris, a switchable focus lens set, a gas cell set and a photon detector sequentially configured along the optical axis of the laser source, wherein the focusing geometry may at least generate high order harmonics, EUV or soft X-Ray, the length of the gas cell equals the confocal parameter of the laser source and the chosen focus lens of the focus lens set may exactly ionize objective gas in the gas cell system, that generates high order harmonics; (2) utilizing the defocusing effect to compensate the phase mismatch of a target high order harmonic, comprising: replacing the gas cell with a gas cell having a shorter cell length and replacing the focus lens with a focus lens having a shorter focal length based on the yield of the target high order harmonic by sequentially and iteratively adjusting the aperture size of the adjustable iris, the focus position of the laser source with respect to the gas cell and the pressure of the gas cell; obtaining an combination of the cell length, focal length, aperture size, focus position and the pressure of the gas cell achieving the phase matching of the target high order harmonic by computing the photon signal via the analyzer; and accomplishing the optimization of high order harmonic generation.

Another exemplary embodiment of the present disclosure provides an optimization system for utilizing the laser defocusing effect for phase matching of high order harmonic generation, comprising: a laser source; an adjustable iris; a switchable focus lens set, having a plurality of focus lenses with different focal lengths and mounted on a driving mechanism; a gas cell set, having a plurality of gas cells with different cell lengths and connecting a gas source; a photon detector; and a computer system comprising a analyzer and a controller and electrically connected to the adjustable iris, the switchable focus lens set, the driving mechanism, the gas cell set, the gas source and the photon detector respectively; wherein the adjustable iris, the switchable focus lens set, the gas cell set and the photon detector are sequentially configured along the optical axis of the laser source; the analyzer is configured to compute the photon signal of the photon detector and generate a corresponding computing result; and the controller is configured to adjust the aperture size of the adjustable iris, adjust the focus position of the laser source with respect to the gas cell by controlling the driving mechanism and/or replacing the focus lens, adjust the pressure of the gas cell via the gas source, and replace the gas cell according to the corresponding computing result.

Preferably, the laser source may be any wavelength.

Preferably, the optimization system may include a filter and a diffraction grating sequentially configured along the optical axis of the laser source between the gas cell and the photon detector for spectrally dispersing the high order harmonics as a spectrometer.

Preferably, the filter may be made of metals or dielectric mirrors for separating high order harmonics from the fundamental harmonic.

Preferably, the optimization system may include a KB mirror (Kirkpatrick-Baez), a toroidal mirror or an elliptical mirror configured along the optical axis of the laser source for refocusing high order harmonics into the photon detector.

Preferably, the cell length of the gas cell achieving the phase matching of a target high order harmonic may be less than the confocal parameter of the laser source.

A system and method capable of solving the phase mismatch problem of high order harmonic generation are provided, especially in the case of tight focusing geometry.

This optimization invention solves the temporal phase mismatch issue: extending the HHG cutoff by controlling the rapid self-defocusing effect of the driving laser. This scheme takes advantage of the additional intrinsic atomic dipole phase mismatch introduced by the rapid laser defocusing. This phase can be precisely controlled by adjusting the following five parameters, (1) the aperture size of the adjustable iris, (2) the focus position with respect to the gas cell (3) the backing pressure of the gas cell, (4) the focal length and (5) the length of the gas cell, to correctly compensate free electron dispersion, resulting in tunable harmonic energy and cutoff extension.

BRIEF DESCRIPTION OF THE DRAWINGS

The foregoing and other features and advantages of the present disclosure will become more apparent through the embodiments described in detail with reference to the accompanying drawings, wherein.

DETAILED DESCRIPTION OF THE PREFERRED EMBODIMENTS

The technical features, contents, advantages and effects of the present disclosure will become more comprehensible through the accompanying drawings and the embodiments described in detail as follows. The drawings are intended to illustrate and assist the specification and do not depict the actual ratio and the precise configuration in the implement of this disclosure. Consequently, the scope of the present disclosure should not be interpreted as or limited to the ratio and configuration of the drawings.

The term "and/or" means one or more than one of any related items or all combinations thereof. The term "at least one of" preceding a list of elements modifies entire list of elements rather than a singular element of the list.

Figure 1:
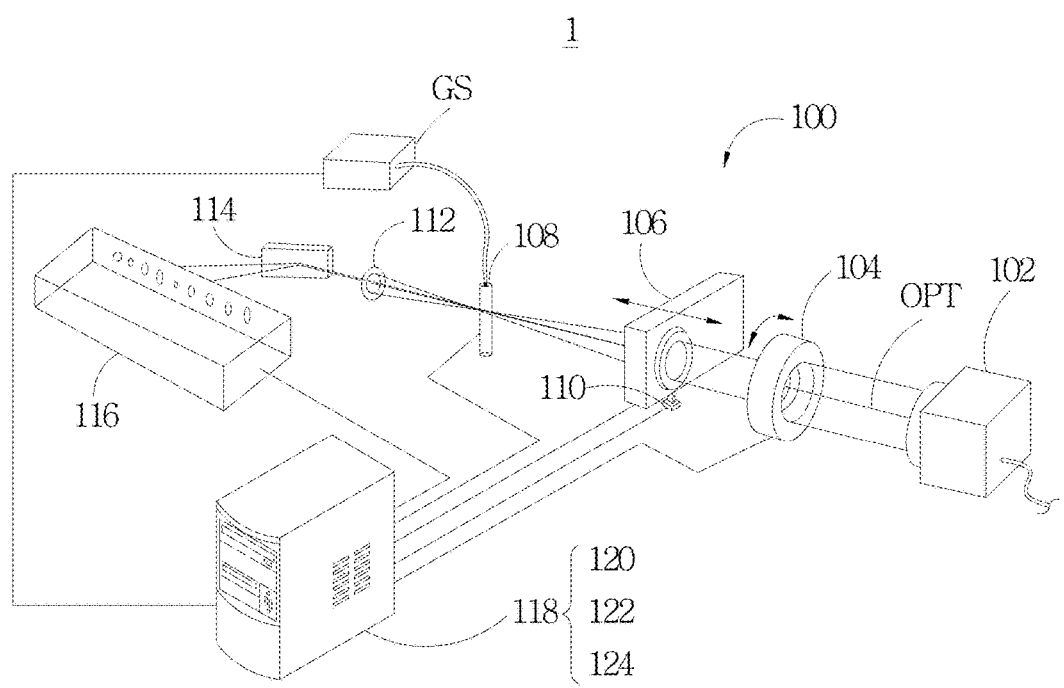
FIG. 1 illustrates an optimization system of high order harmonic generation according to an embodiment of the disclosure.

Refer to FIG. 1, which illustrates the optimization system 1 of high order harmonic generation in tight focusing geometry according to an embodiment of the present disclosure, wherein the tight focusing geometry indicates that at least one high numerical aperture lens focusing light for phase and/or polarization modulation is set. The optimization system 1 of high order harmonic generation includes the tight focusing geometry 100. The tight focusing geometry 100 includes the laser source 102, the adjustable iris 104, the switchable focus lens set 106, the gas cell 108 and the photon detector 116 sequentially arranged along the optical axis OPT of the laser source 102. The switchable focus lens set 106 mounted on the driving mechanism 110 includes a plurality of focus lenses with different focal lengths. The driving mechanism 110 is configured to adjust the position of the switchable focus lens set 106 along the optical axis OPT. The gas cell 108 is connected to the gas source GS providing objective gas into the gas cell 108.

The photon detector 116 receives the generated high order harmonic beam for the follow-up spectrum computation. It should be noted that the optical filter 112 and the EUV diffraction grating 114 are further configured between the gas cell 108 and the photon detector 116 along the optical axis OPT. Preferably, the KB (Kirkpatrick-Baez) mirror is further configured behind the EUV diffraction grating 114.

As shown in FIG. 1, the optimization system 1 of high order harmonic generation includes the computer system 118 connecting to the adjustable iris 104, the focus lens set 106, the driving mechanism 110, the gas cell set (not shown), the gas source GS and the photon detector 116 respectively. The computer system 118 may include the analyzer 120, the controller 122 and the processor 124, and these modules and the device may be implemented through hardware, software code and/or firmware having the functions described below. Note that the computer system 118 connects to the gas cell 108 as shown in FIG. 1, wherein the gas cell 108 represents one gas cell in the gas cell set (not shown) and the computer system 118 or, more precisely, the controller 122 controls the replacement between different gas cells 108 having different cell lengths in the gas cell set.

In one embodiment of the present invention, the analyzer 120 may execute software code to analyze the spectrum (photon signal) of high order harmonics and generate the corresponding computing result. The controller 122 may adjust the aperture size of the adjustable iris, adjust the focus position of the laser source with respect to the gas cell by controlling the driving mechanism and/or replacing the focus lens, adjust the pressure of the gas cell via the gas source, and replace the gas cell according to the corresponding computing result.

In detail, the adjustable iris 104 may comprise an axial control motor to control the aperture size of the iris. The driving mechanism 110 may comprise a step motor configured along the optical axis OPT, but the present disclosure should not be limited to this. The tight focusing geometry may comprise any kind of electronic control systems to precisely control the position of the switchable focus lens set 106 along the optical axis OPT. Furthermore, the gas source GS may be a gas control system comprising a plurality of gas steel bottles for saving different kinds of gas and a plurality of pumps, gas valves and gas pipes for controlling the flow amount, gas type and pressure in the gas cell 108.

In one embodiment of the present invention, the processor 124 may be electrically connected to the controller 122 and the analyzer 120 respectively. The corresponding computing result is transmitted from the analyzer 120 through the processor 124. The controller 122 connected to the processor 124 controls the aperture size, focus position, the pressure of the gas cell and the cell length according to the corresponding computing result.

According to an embodiment of the present invention, the optimization method utilizing the laser defocusing effect for phase matching of high order harmonic generation includes two processes: (1) initializing high order harmonic generation; and (2) utilizing the defocusing effect to compensate the phase mismatch of a target high order harmonic, as shown in FIG. 4 and FIG. 5.

In the initialization process of high order harmonic generation, a focus with the peak intensity just ionizing objective gas in the gas cell 108 is tuned by precisely controlling those optical elements of the tight focusing geometry 100, especially the aperture size of the iris 104. Note that the cell length of the gas cell 108 used in the initialization process equals the confocal parameter ($2\pi\omega_0^2/\lambda$, where $\omega_0$ is beam waist radius and $\lambda$ is the wavelength of the laser source) of the laser source 102. Furthermore, the laser source used in the optimization method and system disclosed in the present invention may be any wavelength.

The initialization process further comprises: adjust the aperture size of the adjustable iris 104, the focus position of the laser source 102 with respect to the gas cell 108, and the pressure in the gas cell 108 to optimize the flux of the high order harmonics. In detail, the flux of the high order harmonics is detected by the photon detector 116. The photon signal generated by the photon detector 116 is then transmitted to the computer system 118. The analyzer 120 generates the computing result corresponding to the photon signal (the corresponding computing result). The processor 124 transmits the corresponding computing result to the controller 122. The controller 122 eventually controls: the aperture size of the adjustable iris 104 via, for example, the axial control motor of the adjustable iris 104; the focus position of the laser source 102 with respect to the gas cell 108 via, for example, the step motor of the driving mechanism 110 and/or via replacing the focus lens of the focus lens set 106; and the pressure in the gas cell 108 via the gas pump and valves of the gas source GS.

Figure 4:
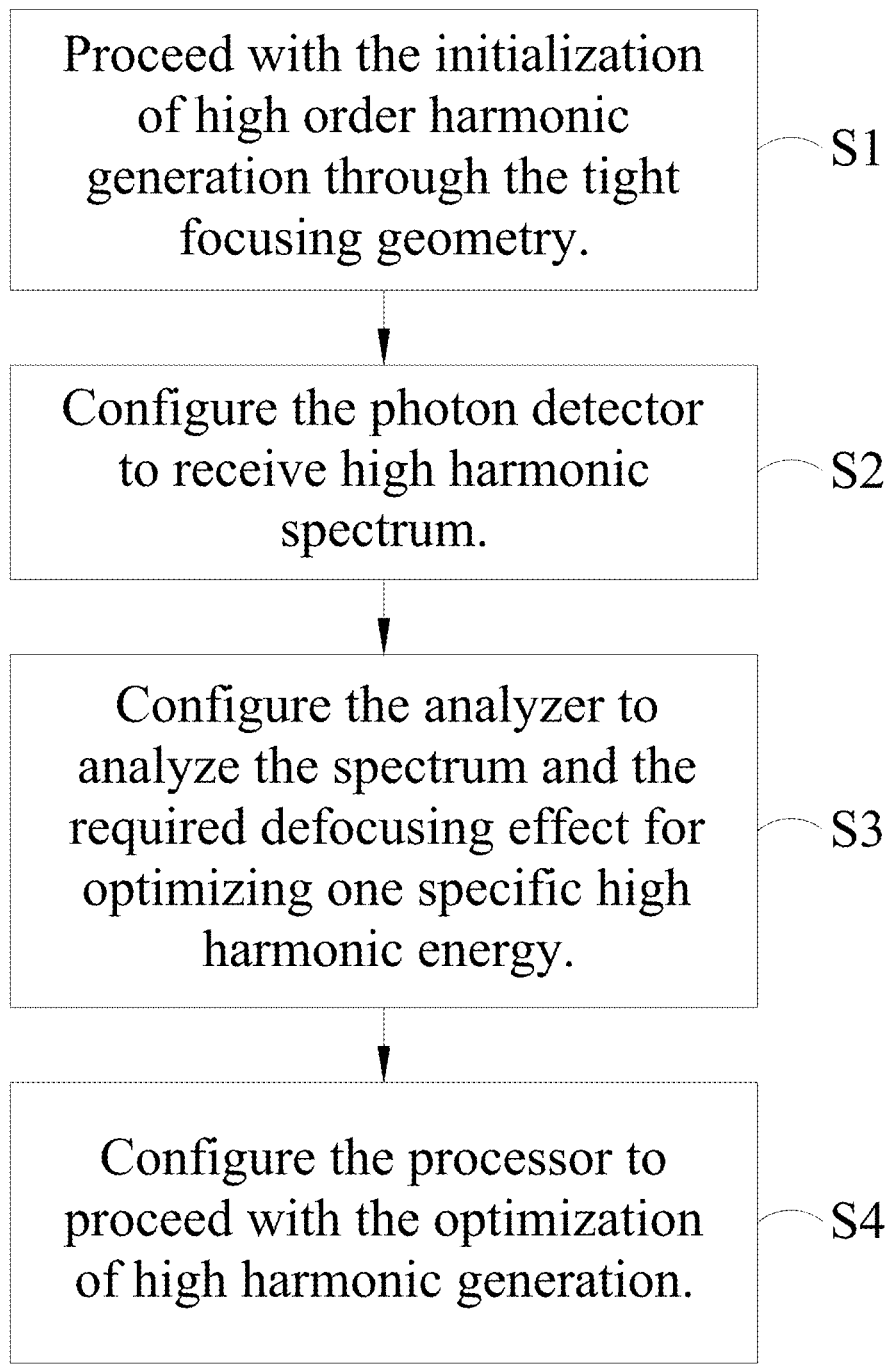
FIG. 4 and FIG. 5 illustrate the optimization method of high order harmonic generation according to an embodiment of the present disclosure.
Figure 5:
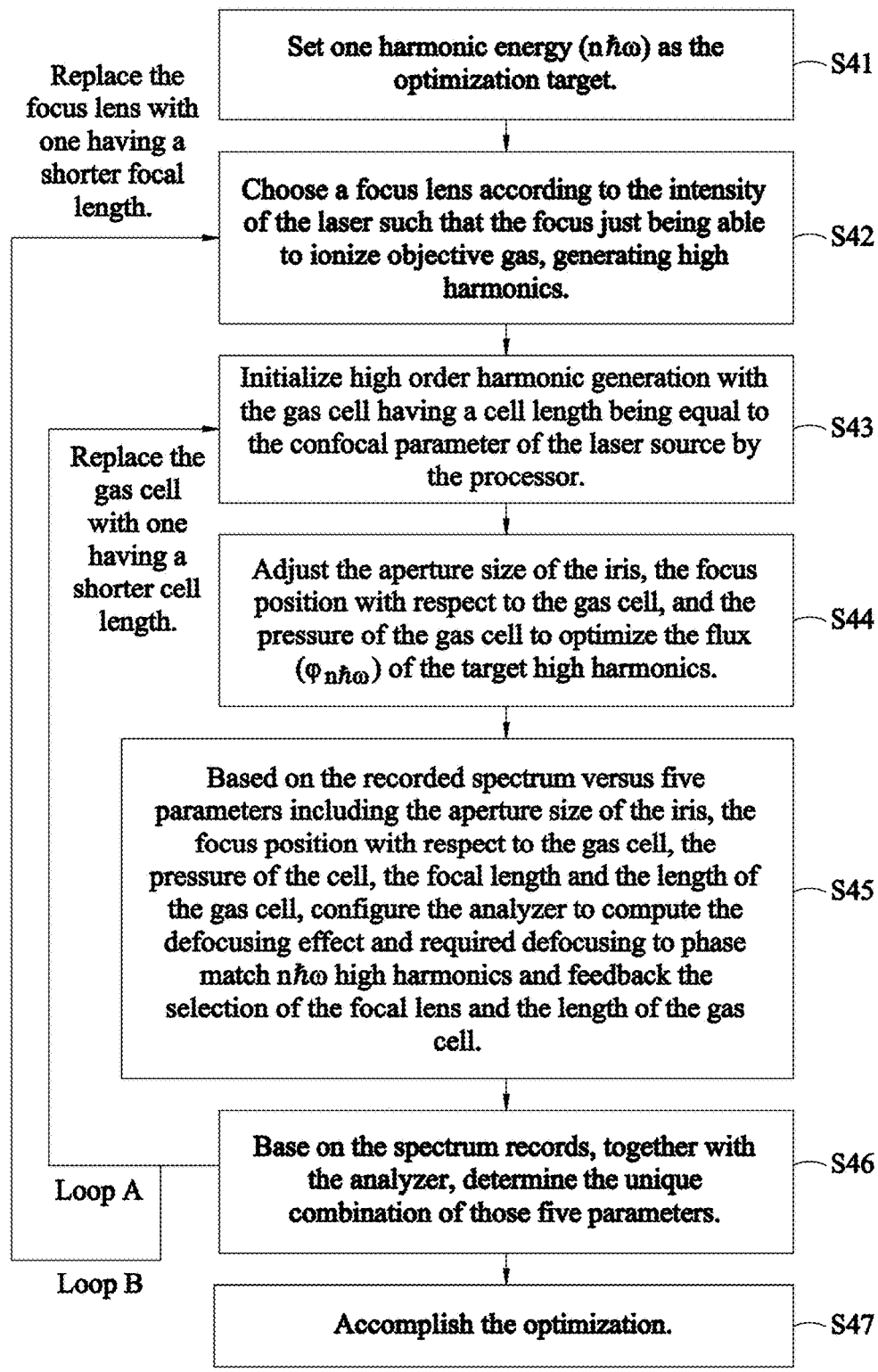

Refer to FIG. 4 and FIG. 5, which illustrate the optimization method of high order harmonic generation according to an embodiment of the present disclosure. In FIG. 4, four main steps (S1-S4) represent overall process of high order harmonic generation utilizing the laser defocusing effect, including:

Step S1: proceed with the initialization of high order harmonic generation through the tight focusing geometry.

Step S2: configure the photon detector to receive high harmonic spectrum.

Step S3: configure the analyzer to analyze the spectrum and the required defocusing effect for optimizing one specific high harmonic energy.

Step S4: configure the processor to proceed with the optimization of high harmonic generation.

Refer to FIG. 5, which illustrates details of high order harmonic generation of FIG. 4. In the embodiment of FIG. 1, the optimization method includes:

Step S41: Set one harmonic energy ($n\hbar\omega$) as the optimization target.

Step S42: Choose a focus lens of the focus lens set 106 according to the intensity of the laser source 102 such that the focus may just be able to ionize objective gas in the gas cell 108 and generate high harmonics.

Step S43: Initialize high order harmonic generation with the gas cell 108 having a cell length being equal to the confocal parameter of the laser source 102 by the processor 124.

Step S44: Adjust the aperture size of the adjustable iris 104, the focus position with respect to the gas cell 108, and the pressure of the gas cell 108 to optimize the flux ($\varphi_{n\hbar\omega}$) of the target high harmonics.

Step S45: Based on the recorded spectrum versus five parameters including the aperture size of the adjustable iris 104, the focus position with respect to the gas cell, the pressure of the gas cell 108, the focal length of the focus lens and the length of the gas cell 108, configure the analyzer 120 to compute the defocusing effect and required defocusing to phase match $n\hbar\omega$ high harmonics and feedback the selection of the focal lens and the length of the gas cell.

Step S46: Base on the spectrum records, together with the analyzer 120, determine the unique combination of those five parameters.

Loop A: replace the gas cell 108 with one having a shorter cell length in the gas cell set (not shown).

Loop B: replace the focus lens with one having a shorter focal length in the focus lens set 106.

Step S47: Accomplish the optimization.

In one embodiment of the present invention, the processor 124 may record the prompt photon signal, which determines the motion of those foregoing motors (the step motor and axial control motor) and the action of the pump and valves. When the optimized flux of the target harmonic order is achieved, the processor 124 may further record the combination of those five parameters (1)-(5).

Figure 2:
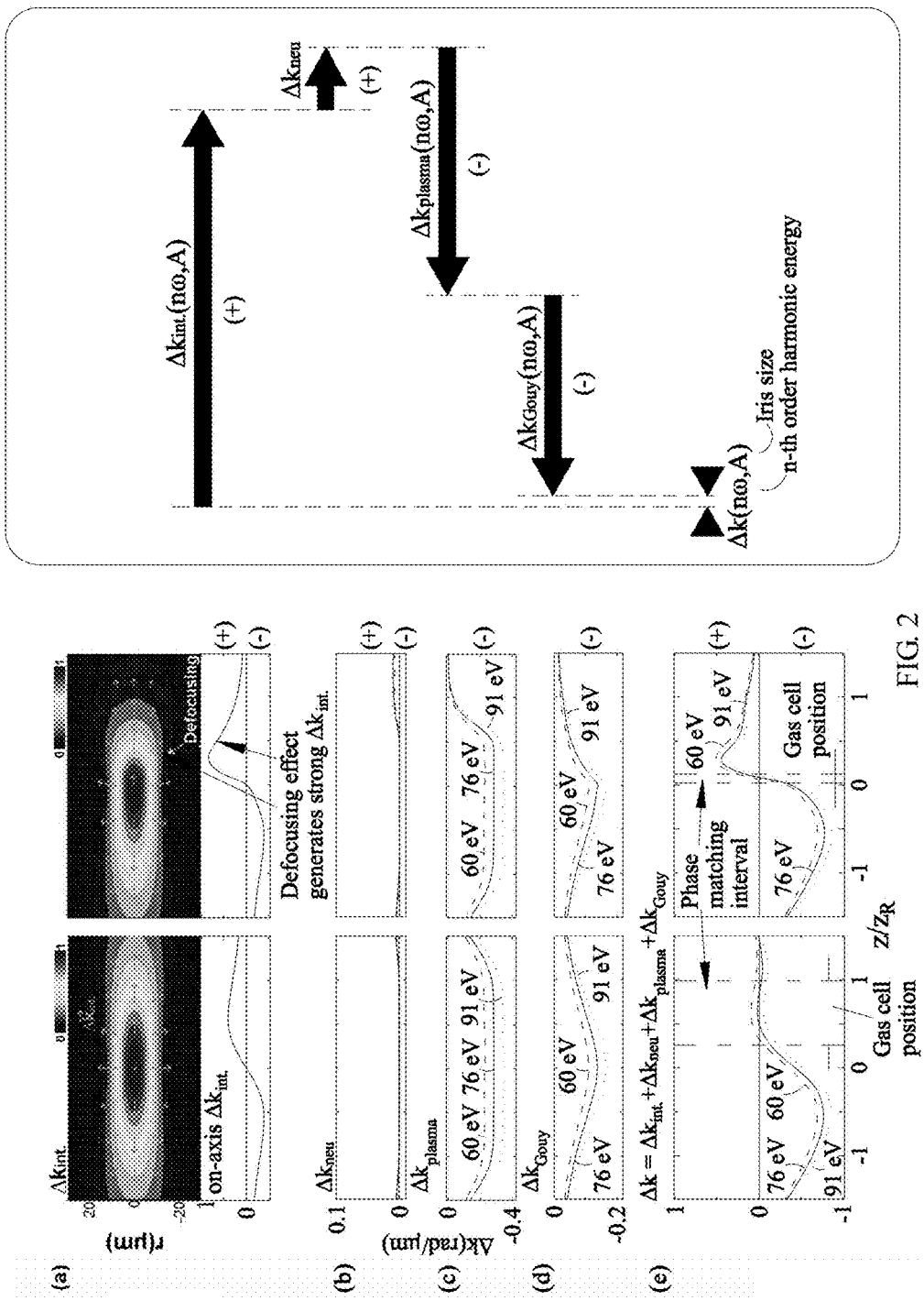
FIG. 2 illustrates how to make use of the defocusing effect for high order harmonic generation and how to control the iris for phase matching.

Refer to FIG. 2. The left side of FIG. 2(a) shows the focusing without the plasma-induced defocusing effect and the right side of FIG. 2(a) shows the focusing under phase matching of high order harmonics via the plasma-induced defocusing effect achieved by the precisely controlled iris size. The vectors on the right side of FIG. 2 denote phase matching of high order harmonics. The tight focusing geometry may generate strong plasma, producing strong defocusing effect. Adjusting the defocusing effect through the iris improves the phase matching ($\Delta k=0$) of high order harmonics, controlling the central energy and extending the cutoff energy of high order harmonics. A shorter and precisely positioned gas cell is needed for making use of the defocusing effect and the precise parameters thereof may be obtained according to the optimization principle of the disclosure.

Excessively ionized electrons limit the phase matching in the conventional phase-matching method. In the present disclosure, the defocusing effect of the laser itself is implemented, and the high intensity of the laser source, short gas cell and high pressure are needed for achieving phase matching. Phase matching may be implemented by adjusting the aperture size of the iris. The defocusing effect and the high order harmonic phase variation caused by the rapidly laser intensity decrease in a short distance may compensate the phase mismatch of high order harmonics induced by free electrons. Phase matching of high order harmonics is achieved through adjusting the aperture size of the adjustable iris 106 and the focus position with respect to the gas cell 108, resulting in the control of the central energy of high order harmonics and extension of HHG cutoff. The optimization method of the present disclosure also enhances the conversion efficiency of the selected harmonics so as to extend the application of the EUV light source.

Refer to FIG. 2. The optimization system and the principle thereof of high harmonic generation will be described in detail. The nonlinear effect generates high order harmonics. The output flux of the n-th order harmonic from $z=0$ to $z=L$ along z-axis is obtained by integrating all of the n-th order harmonic of different positions along the foregoing path ($z=0$ to $z=L$ along z-axis), which is presented as $\int_{z=0}^{z=L} E_n \cdot e^{i \Delta k \cdot z} dz$, wherein $E_n$ is the amplitude of the n-th order harmonic, $\Delta k = k_{n\omega} - n \cdot k_\omega$ represents the amount of wave momentum mismatch between the laser (with the frequency $\omega$) and the n-th order harmonic electric field (with the frequency $n\omega$). When the phase matching is achieved, $\Delta k=0$ and the flux of the n-th order harmonic electric field is maximal, that is, the above integral is maximal. However, when the laser beam is focused at the gas cell to generate high order harmonics, there are few dispersions influencing the net wave vector $\Delta k$: the dipole phase of high order harmonics ($\Delta k_{int.}$), dispersions of objective gas ($\Delta k_{neu}$), dispersions of the plasma ($\Delta k_{plasma}$) and Gouy phase shift ($\Delta k_{Gouy}$), etc., which result in phase mismatch as: $\Delta k = \Delta k_{int.} + \Delta k_{neu} + \Delta k_{plasma} + \Delta k_{Gouy} \neq 0$. A laser which suddenly meets gas media having a high pressure may generate massive ionization and release lots of free electrons (plasma). Those free electrons cause the phase mismatch of high order harmonics. Those free electrons also spatially cause the defocusing of the laser beam. However, a phase mismatch (Δk≠0) of a laser caused by free electrons may just be compensated by the dipole phase of high order harmonics induced by such defocusing processes at an appropriate laser intensity. Referring to FIG. 2, phase matching is achieved by controlling the adjustable iris 104 described above and the laser focus position with respect to the gas cell 108, that is, Δk=0.

In the geometry of the present disclosure, according to one embodiment of the present disclosure, the laser source 102 is a 25 fs, 600 μJ and 800 nm pulse laser and focused into the gas cell 108 through the switchable focus lens set 106, as shown in FIG. 1, wherein the gas cell 108 is filled with the Ar gas. The laser source 102 is a high quality beam having a Gaussian intensity distribution with an 8 mm beam diameter ($W_0$). The gas cell 108 is made of the acrylic tube with two holes punctured by laser on the left and right ends respectively, wherein each of the holes has a small diameter so as to minimize the loading of the vacuum system and prevent the laser defocusing effect generated by the plasma before the laser enters the gas cell 108. In addition, the adjustable iris 104 is placed in front of and approximately 5 cm from the switchable focus lens set 106 to adjust the beam size of the laser source 102. Further, the switchable focus lens set 106 is attached to the driving mechanism 110. The driving mechanism 110 is configured to move slightly along the optical axis OPT for adjusting the position of the focus lens set 106 on the optical axis OPT. When the position of the switchable focus lens set 106 is adjusted, the focus position of the laser source 102 with respect to the gas cell 108 is adjusted simultaneously. In vacuum and a fully opened iris 104, peak intensity thereof may be up to about $3.6 \times 10^{15}$ W/cm$^2$ and the confocal parameter of the focus is about 4 mm. For such a high intensity, Ar gas may be easily ionized and multiple Ar ions are thus generated at the pulse peak of the laser in the gas cell 108 (with the ionization rate>300%), which produces strongly laser defocusing. The foregoing parameters are computed according to the Ammosov-Delone-Krainov (ADK) ionization model.

Obviously, when interacting with the gas media, the pulse laser ionizes the gas, sequentially generates the high density plasma and simultaneously induces the defocusing effect that changes the laser intensity. An Al or Zr optical filters are placed behind the gas cell 108, which filters the 800 nm light while the EUV penetrates the filter. A KB mirror may be configured in front of an EUV diffraction grating and the high harmonics of different energy are focused on different positions of the photon detector.

Figure 3:
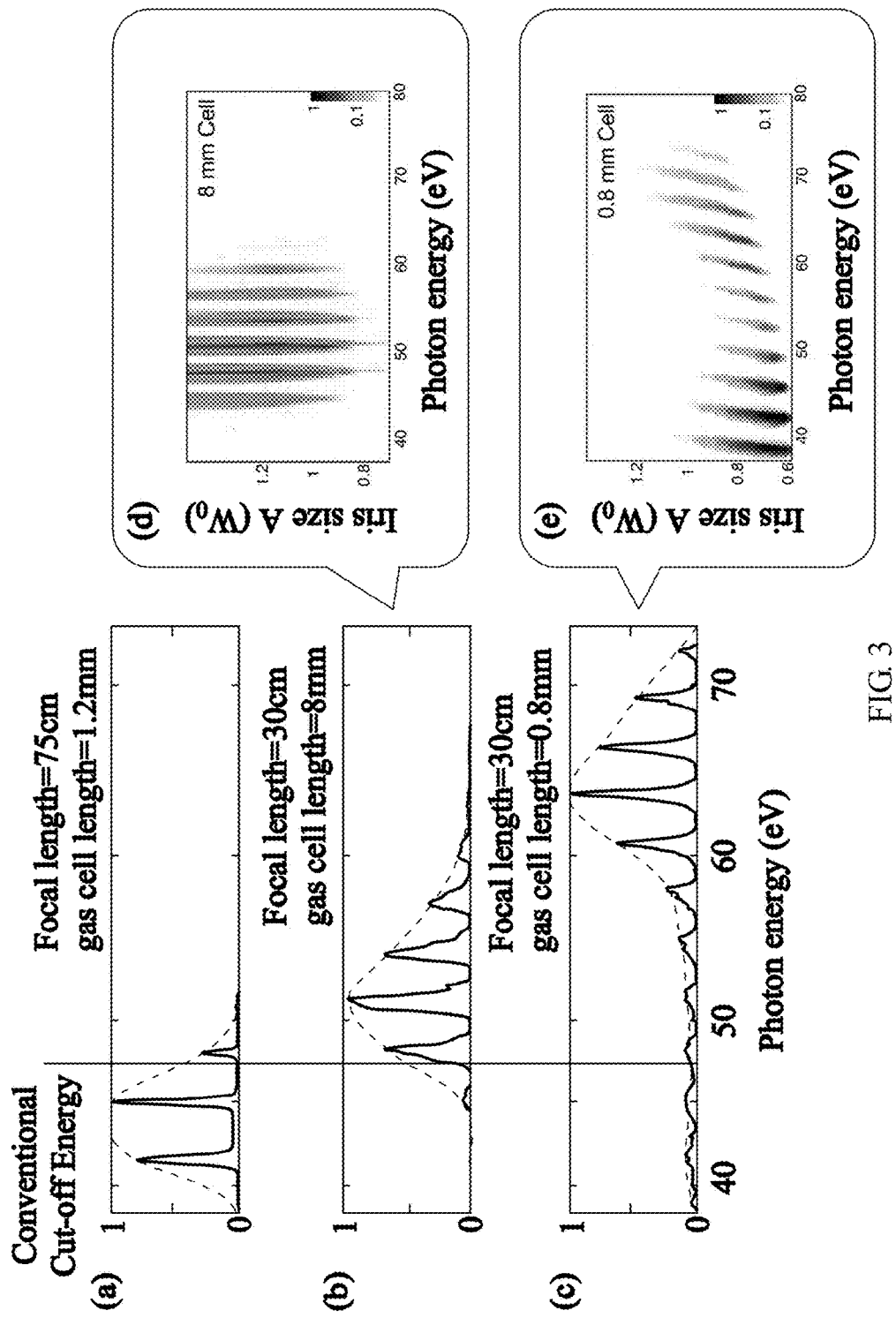
FIG. 3 illustrates the extended cutoff energy and yield of the high order harmonics according to an embodiment of the present disclosure.

In order to show the importance of the geometry optimization for the high order harmonic energy and how the aperture size benefits the adjustment of the high order harmonic energy, three kinds of geometry structures are shown in FIG. 3. In FIG. 3, (a) represents long focal length of f=75 cm and a short gas cell; (b) represents short focal length of f=30 cm and a long gas cell; (c) represents short focal length of f=30 cm and a short gas cell. After the aperture size of the adjustable iris 104, the laser focus position, the cell length of the gas cell 108 and the pressure of the gas cell 108 are optimized, it is apparent that higher cutoff energy takes place in the (c) geometry structure (short focal length and short gas cell). FIG. 3(e) also shows that in the optimized geometry (short focal length and short gas cell), the central energy of high harmonics may be adjusted from 35 eV to 70 eV by adjusting the aperture size of the iris. Since it is very easy for high intensity lasers to ionize objective gas, generate free electrons (plasma) and generate the defocusing effect simultaneously, phase matching (Δk=0) may then be achieved by controlling the defocusing effect through adjusting the aperture size of the iris. The optimization process of the present disclosure has considered how to adjust the defocusing effect, how to select a proper focal length and cell length of the gas cell and how to adjust the pressure of the gas cell for optimizing the flux of the target high harmonics.

In comparison with the conventional long distance focusing geometry, FIG. 3(a), and the long cell geometry, FIG. 3(b), in which plasma-induced defocusing effect cannot be implemented, thus phase matching is not possible at high photon energies. On the contrary, as shown in FIGS. 3(c) and (e), the cutoff energy of high harmonics can be extended by using a short focal length, a short gas cell and an iris with a proper aperture size.

Refer to FIG. 1 to FIG. 3. Controlling the adjustable iris 104 modifies the beam size of the laser source 102. In this case, the gas cell 108 having a short cell length provides the follow-up advantages:

First, when high intensity, short gas cell length, and high pressure are applied and when the precisely controlled aperture size of the iris modifies the laser beam size and the focus position of the laser in the gas cell, the cutoff energy may exceed that of the conventional phase matching restriction. (The cutoff energy of the conventional phase matching restriction is 50 eV for high harmonics, when the driving laser source is 800 nm and the objective gas is Ar.)

Further, when a short focal length, short gas cell and the optimization method of the present disclosure are used, the conversion efficiency in 65 eV range is significantly enhanced up to more than 400 times in comparison with the conventional long distance focusing geometry and the long gas cell geometry. Besides, the optimization method of the present disclosure may also provide wide-range harmonics in the tight focusing geometry.

The advantage of using the gas cell 108 having a short cell length is that when the aperture size of the adjustable iris 102 is changed, the high order harmonic peaks become highly selectable and adjustable. As shown in FIG. 3(e), when the aperture size of the adjustable iris 102 varies from 0.6 $W_0$ to 0.9 $W_0$, the central energy of the high order harmonic spectrum varies from 35 eV to 70 eV continuously even though the harmonics become weak when the aperture size is larger than 0.9 $W_0$. This is because the laser defocusing becomes too strong, that limits the available peak intensity of high harmonic generation for high energy. Although only the 0.8 mm gas cell 108 is used in the embodiment, the disclosure should not be limited to this. Shorter focal lengths and shorter gas cells are allowable as long as the optimization process of the present disclosure is complied with.

The present disclosure extends the cutoff energy of high harmonics by controlling the plasma-induced defocusing of the driving laser. The method makes use of the laser defocusing effect for inducing an additional phase ($\Delta k_{int.}$) of high order harmonics. The phase is accurately controlled—the phase mismatch is precisely corrected by adjusting the aperture size of the iris and the focus position in the gas cell. Consequently, the iris may adjust the high order harmonic energy and extend cutoff energy of HHG. A person skilled in the art may implement the optimization method and system for lasers of any wavelength according to the disclosure in the specification, even in the scope of atoms, molecules and solid-state materials. The new method and principle of phase matching provides significant influence on the efficiency of high order harmonic generation, attosecond science and nonlinear optics.

A person skilled in the art should understand that the formation and details of the exemplary embodiments described above may be modified without departing the spirit and the scope defined in claims and the equivalents of the present disclosure.

What is claimed is:

1. An optimization method for utilizing laser defocusing effect for phase matching of high order harmonic generation, the method comprising:
    configuring a laser source;
    configuring an adjustable iris, a switchable focus lens set having a plurality of focus lenses with different focal lengths and mounted on a driving mechanism, a gas cell set having a plurality of gas cells with different cell lengths and connecting a gas source, and a photon detector sequentially along an optical axis of the laser source;
    configuring a computer system comprising a analyzer and a controller and electrically connected to the adjustable iris, the switchable focus lens set, the driving mechanism, the gas cell set, the gas source and the photon detector respectively;
    processing initialization of high order harmonic generation, comprising:
        setting one harmonic energy as an optimization target;
        choosing one of the gas cells having a cell length equals a confocal parameter of the laser source;
        choosing one of the focus lenses by the controller to produce a focus having a peak intensity exactly being able to ionize objective gas in the gas cell and generate high order harmonics; and
        adjusting aperture size of the adjustable iris, focus position of the laser source with respect to the gas cell via the driving mechanism and pressure of the gas cell via the gas source by the controller to optimize flux of the high order harmonics according to a photon signal detected by the photon detector; and
    utilizing defocusing effect to compensate phase mismatch of a target high order harmonic, comprising steps of:
        replacing the gas cell with a gas cell having a shorter cell length and replacing the focus lens with a focus lens having a shorter focal length based on yield of the target high order harmonic by sequentially and iteratively adjusting the aperture size of the adjustable iris, the focus position of the laser source with respect to the gas cell and the pressure of the gas cell;
        obtaining an combination of the cell length, the focal length, the aperture size, the focus position and the pressure of the gas cell achieving phase matching of the target high order harmonic by computing the photon signal via the analyzer; and
        accomplishing optimization of high order harmonic generation.

2. The optimization method of claim 1, further comprising configuring a filter and a diffraction grating sequentially along the optical axis of the laser source between the gas cell and the photon detector.

3. The optimization method of claim 2, wherein the filter is made of metals or dielectric mirrors for separating high order harmonics from a fundamental harmonic.

4. The optimization method of claim 1, further comprising configuring a KB mirror (Kirkpatrick-Baez), a toroidal mirror or an elliptical mirror along the optical axis of the laser source for refocusing high order harmonics into the photon detector.

5. The optimization method of claim 1, wherein the cell length of the gas cell achieving the phase matching of the target high order harmonic is less than the confocal parameter of the laser source.

6. An optimization system for utilizing laser defocusing effect for phase matching of high order harmonic generation, comprising:
    a laser source;
    an adjustable iris;
    a switchable focus lens set, having a plurality of focus lenses with different focal lengths and mounted on a driving mechanism;
    a gas cell set, having a plurality of gas cells with different cell lengths and connecting a gas source;
    a photon detector; and
    a computer system comprising a analyzer and a controller and electrically connected to the adjustable iris, the switchable focus lens set, the driving mechanism, the gas cell set, the gas source and the photon detector respectively;
    wherein the adjustable iris, the switchable focus lens set, the gas cell set and the photon detector are sequentially configured along an optical axis of the laser source; the analyzer is configured to compute a photon signal of the photon detector and generate a corresponding computing result; and the controller is configured to adjust aperture size of the adjustable iris, adjust focus position of the laser source with respect to the gas cell by controlling the driving mechanism and/or replacing the focus lens, adjust pressure of the gas cell via the gas source, and replace the gas cell according to the corresponding computing result.

7. The optimization system of claim 6, further comprising a filter and a diffraction grating sequentially configured along the optical axis of the laser source between the gas cell and the photon detector.

8. The optimization system of claim 7, wherein the filter is made of metals or dielectric mirrors for separating high order harmonics from a fundamental harmonic.

9. The optimization system of claim 6, further comprising a KB mirror (Kirkpatrick-Baez), a toroidal mirror or an elliptical mirror configured along the optical axis of the laser source for refocusing high order harmonics into the photon detector.

10. The optimization system of claim 6, wherein the cell length of the gas cell achieving phase matching of a target high order harmonic is less than a confocal parameter of the laser source.

* * * * *